2,701,241

STABILIZATION OF POLYSTYRENE WITH 2,4-DINITROPHENYLHYDRAZINE

Ernest H. Wood, Westfield, N. J., and James R. Wilkinson, Milwaukee, Wis., assignors to Union Carbide and Carbon Corporation, a corporation of New York No Drawing. Application May 19, 1953, Serial No. 356,102

2 Claims. (Cl. 260—45.9)

This invention relates to compositions comprising a polystyrene resin and to the stabilization of such compositions against degradation or decomposition upon weathering and upon exposure to elevated temperatures in the presence of air.

Polystyrene has become widely known as it possesses many unique and desirable properties which lend themselves to many purposes. Although its applications are numerous and its uses extensive, there are instances in which the performance of polystyrene is not entirely satisfactory. For example, when polystyrene is exposed to elevated temperatures in the presence of air, or to normal temperatures in the presence of ultraviolet light as under conditions of outdoor use, destruction of the plastic occurs by a process known as molecular degradation. This phenomenon has the effect of causing the individual molecules of polystyrene to crack, or depolymerize to lower polymers and results in the plastic turning yellow, becoming dull and, eventually, fine cracks and crevices develop on its surface.

Heretofore, to overcome molecular degradation or decomposition of polystyrene from the above causes, it has generally been necessary to employ two stabilizers; one of which functions to stabilize the resin against the effects of weathering or outdoor use, and the other of which functions to stabilize the resin against the effects of elevated temperatures. This method of stabilizing polystyrene has not been entirely satisfactory and, therefore, it is an object of this invention to provide a new stabilizer which will effectively stabilize polystyrene against molecular degradation due to either elevated temperatures, outdoor exposure, or both.

We have found that the incorporation of small amounts of 2,4-dinitrophenylhydrazine in polystyrene resins effectively retards degradation, or decomposition of the polymer when subjected to either or both of the above conditions. While varying amounts of the stabilizer may be employed, we have found that from about 0.01 percent to about 15 percent by weight of polystyrene resin is particularly efficacious. However, our preferred range varies from about 0.1 percent to 1.0 percent by weight of polystyrene resin. The stabilizing agent must be intimately admixed with the resin, and it has been found that the quantities of the stabilizing agent employed do not materially alter other properties of the product or detract from the value thereof in their customary use.

The stabilizer of our invention may be incorporated in polystyrene resins, or compositions thereof, by any of the well-known methods in the art. For example, this may be accomplished by film-casting wherein the stabilizer and resin are dissolved in a mutual solvent and the solvent subsequently evaporated. Or, if desired, the stabilizer may be incorporated on a conventional two-roll mill, or in a Banbury mixer. In addition, the stabilizer may be added to the polystyrene resin during the course of preparation of a composition in the same manner that coloring materials are normally added.

To illustrate the beneficial aspects of our invention, specimens of polystyrene containing various amounts of 2,4-dinitrophenylhydrazine were subjected to elevated temperature and weathering tests. The elevated temperature test comprised exposing the specimens at 175° C. for one hour in an air-circulating oven. The weathering test comprised placing the specimens in an Atlas XIA accelerated Weather-O-Meter. Normally, weathering tests are conducted out-of-doors and involve the exposure of specimens to the sunlight as it is well-known that molecular degradation occurring during weathering is due primarily to the effects of ultraviolet light and air. Outdoor exposure of the specimens is, of necessity, time-consuming and, therefore, the weathering tests were conducted in the Weather-O-Meter which furnished conditions comparable to outdoor exposure in greatly reduced periods of time.

An effective method for determining the molecular degradation of the polymer comprises comparing the viscosity or relative molecular weight before and after exposure. The relative molecular weight of a polymer is found by measuring the time for a given volume of benzene to flow between two index points on an Ostwald-Fenske viscosity pipette and measuring the time for the same volume of a 0.1000 gram solution of polystyrene in 100 ml. of benzene to flow between the identical index points. The relative molecular weight is then calculated from the following formula:

$$\text{Relative molecular weight} = 578{,}000 \left(\frac{Ts}{Tb} - 1\right)$$

where
$Ts$ = time for polystyrene solution
$Tb$ = time for benzene

The following examples more fully disclose the invention:

EXAMPLE I

Specimens of polystyrene containing 0, 0.01, 0.1, 1.01, 5.26 and 11.11 percent by weight of polystyrene resin of 2,4-dinitrophenylhydrazine were prepared by dissolving the resin and stabilizer in a benzene solvent and the solvent evaporated by heating a thin layer of the solution on a glass plate, thus forming a film. The films were then broken up and compression-molded into specimens of 0.030 to 0.034 inch thickness. The specimens were then subjected to weathering conditions by exposing them for 500 hours in an Atlas XIA Weather-O-Meter. Degradation of polystyrene was measured by determining the loss of relative molecular weight of the stabilizer and unstabilized specimens.

The following table comprises a tabulated account of the molecular weights of the various specimens before and after exposure:

*Table 1*

| Percent of Stabilizer By Weight of Polystyrene | Relative Molecular Wgt.×10⁻³ Before Exposure | Relative Molecular Wgt.×10⁻³ After Exposure |
|---|---|---|
| 0.00 | 55.3 | 40.2 |
| 0.01 | 65.1 | 49.2 |
| 0.10 | 66.1 | 57.0 |
| 1.01 | 65.6 | 65.1 |
| 5.26 | 61.8 | 57.0 |
| 11.11 | 59.1 | 57.0 |

As may be readily seen from the above table, specimens of polystyrene containing the stabilizer of our invention are effectively stabilized against decomposition and against excessive loss of molecular weight caused by weathering.

EXAMPLE 2

Specimens containing 0, 0.01, 0.1, 1.01, 5.26 and 11.11 percent by weight of polystyrene resin of 2,4-dinitrophenylhydrazine, and of 0.020 inch thickness, were prepared in the identical manner disclosed in Example 1. The specimens were then subjected to an elevated temperature test conducted in an air-circulating oven at 175° C. for a period of one hour. Degradation of polystyrene was measured by determining the loss of relative molecular weight of the stabilized and unstabilized specimens.

The following table comprises a tabulated account of the molecular weights of the specimens before and after exposure:

Table II

| Percent of Stabilizer By Weight of Polystyrene | Relative Molecular Wgt.×10⁻³ Before Exposure | Relative Molecular Wgt.×10⁻³ After Exposure |
|---|---|---|
| 0.00 | 55.3 | 36.3 |
| 0.01 | 65.1 | 43.5 |
| 0.10 | 66.1 | 61.3 |
| 1.01 | 65.6 | 62.4 |
| 5.26 | 61.8 | 57.0 |
| 11.11 | 59.1 | 52.0 |

As may be readily seen from the above table, specimens of polystyrene containing the stabilizer of our invention are effectively stabilized against decomposition and against excessive loss of molecular weight caused by elevated temperatures.

The above examples clearly illustrate that 2,4-dinitrophenylhydrazine effectively stabilizes polystyrene against molecular degradation ordinarily caused by weathering and by elevated temperatures.

It is to be understood that the stabilizer of our invention may be advantageously employed with all polystyrene resins including the well-known copolymer resins prepared by the copolymerization of polystyrene with other polymerizable compounds. Furthermore, our stabilizer may be effectively employed with all polystyrene compositions prepared by the admixture of the well-known modifying agents, such as plasticizers, pigments, fillers and dyes, with polystyrene resins and copolymer resins.

We claim:

1. A composition of matter comprising polystyrene and from about 0.01 percent to about 15 percent by weight of polystyrene of 2,4-dinitrophenylhydrazine.

2. A composition of matter comprising polystyrene and from about 0.1 percent to about 1 percent by weight of polystyrene of 2,4-dinitrophenylhydrazine.

No references cited.